June 19, 1962 H. J. NOLTE 3,039,892
METHOD FOR METALLIZING CERAMICS AND ARTICLES PRODUCED THEREBY
Original Filed May 14, 1956
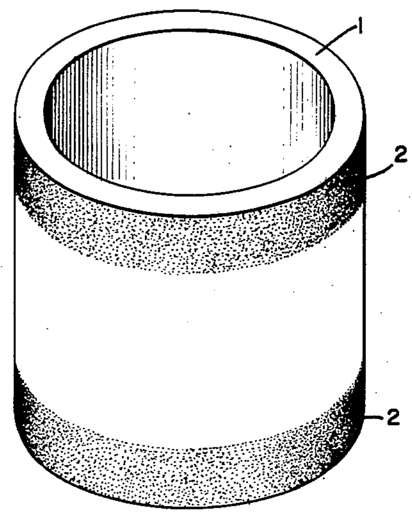
INVENTOR:
HENRY J. NOLTE,
BY Philip L. Schlamp
HIS ATTORNEY.

United States Patent Office 3,039,892

Patented June 19, 1962

3,039,892

METHOD FOR METALIZING CERAMICS AND ARTICLES PRODUCED THEREBY

Henry J. Nolte, Schenectady, N.Y., assignor to General Electric Company, a corporation of New York Original application May 14, 1956, Ser. No. 584,664, now Patent No. 2,904,456, dated Sept. 15, 1959. Divided and this application Dec. 4, 1958, Ser. No. 782,991

5 Claims. (Cl. 117—118)

My invention relates to metalizing ceramics and more particularly to improved metalized coatings for ceramics and to an improved method of applying intimately bonded layers of metals to the surfaces of ceramic members.

The present invention is an improvement over that described and claimed in my U.S. Patents 2,667,427 and 2,667,432, assigned to the assignee of the present invention. Additionally, the present application is a division of U.S. application S.N. 584,664, filed May 14, 1956, on which U.S. Patent No. 2,904,456, issued September 15, 1959, and which is assigned to the same assignee as the present invention. Heretofore, there has been disclosed methods of metalizing ceramic surfaces using a mixture of metallic powders comprising elemental manganese and a metal selected from the group consisting of molybdenum, tungsten, and iron, and mixtures thereof. Further, ceramic members have been disclosed having metalized surfaces comprising manganese and a metal selected from the group consisting of molybdenum, tungsten, iron, nickel and mixtures thereof. The method of coating ceramic members with a metal coating including manganese, and the ceramic members having said type coatings as disclosed, are suitable for many applications.

However, in some electron tube applications ceramics of very high strength must be employed as insulators. Ceramics of this type are the high purity alumina type bodies which are highly refractory and therefore difficult to metalize by conventional means. I have found an improved method to satisfactorily solve these problems and to obtain high production of such metalized ceramic members.

Accordingly, it is a principal object of my invention to provide an improved method of metalizing ceramic members.

It is another object of my invention to provide an improved method of metalizing high refractory ceramic members.

It is another object of my invention to provide ceramic members having improved metalized surfaces on high refractory ceramic members.

In the attainment of the foregoing objects, I provide an improved method for metalizing the surfaces of high refractory ceramic members consisting of applying a coating to said surfaces of a mixture of metallic powders comprising molybdenum powder and chromium. I further provide ceramic members having suitably metalized surfaces comprising molybdenum and chromium to permit operation of said members in high temperature regions.

Other objects and advantages will become apparent after a consideration of the specification and the drawing in which is illustrated a tubular ceramic insulating section having metalized coatings thereon in accordance with my invention.

As an example of the metalizing process of the invention, a metalized coating will be described as applied to a ceramic member which can be of the type known as alumina and which ceramic enjoys wide use in electron tube work. A powder mixture of molybdenum and chromium is produced, for example, by ball milling with a suitable vehicle such as acetone. Next, the vehicle is evaporated and the powder mixture pulverized to reduce the size of the mixture particles. The resultant composition can then be applied in any suitable manner to the surfaces to be metalized. Thereafter, the coated ceramic is allowed to dry following which it is fired at a suitable elevated temperature in a non-oxidizing atmosphere to the metal particles.

In the drawing is shown a ceramic insulator 1 of a type and form used in electron tubes and having chromium-molybdenum metal surfaces 2 thereon, suitable for bonding to metallic members, not shown. I have found that the use of chromium as an element of the metalizing material produces excellent metal to ceramic coatings. Coating the high refractory ceramic bodies, for example, those ceramics containing alumina, becomes more of a problem since these type ceramics require higher temperatures to obtain interface reaction and bonding. In addition to requiring the expensive equipment necessary to obtain the higher temperatures and the excessive time to actually coat the ceramics, a problem arises in coating high refractory ceramics with manganese and molybdenum. Due to the fact that a large part of the metal powder coating is dissipated at the high temperatures in coating with manganese and molybdenum, a second coating and firing is required to be performed, further complicating the coating process. By using a mixture of chromium and molybdenum as the coating, this additional second coating step is eliminated. Moreover, chromium provides better reaction and bonding with the high refractory ceramics than does manganese.

Approximately 10% to 50% chromium is employed as the metalizing material with the remainder being substantially molybdenum. The method of metalizing with a mixture of molybdenum and chromium is similar to that disclosed and claimed in my U.S. Patent No. 2,904,456 referenced above for the molybdenum trioxide-manganese coating. Molybdenum metal powder and chromium powder are introduced into a vehicle and thoroughly mixed. Sufficient vehicle is then added to provide a workable mixture. The metallic mixture is then applied to the ceramic member 1 as by spraying or dipping to provide the desired coated surface, as for example bands 2. The ceramic member with the applied coatings is then fired at temperatures higher than those employed for coating mixture containing manganese. The firing is done in the temperature zone lying between the melting point of the ceramics, which for one type of ceramic in common use, is 1725° C., and the sintering temperature of chromium. Excellent coatings have been obtained by employing 20% chromium, 80% molybdenum and firing the ceramic and the applied coating at a temperature of 1625° C.

While a specific example has been given in describing details of this invention, it will be understood that it has been given merely by way of illustration and that the invention is not limited thereto.

What I claim as new and desire to secure by Letters Patent of the United States is:

1. The method of metalizing a surface of a highly refractory ceramic member which comprises applying to said surface a mixture of metal powders in a vehicle, said mixture consisting essentially of chromium comprising 10% to 50% of said mixture and the remainder molybdenum, heating said member and applied mixture of metal powders in an atmosphere non-oxidizing to said metal powders to a temperature above the sintering temperature of chromium and below the softening point of the ceramic to cause the chromium and molybdenum to form a tightly adhering metal surface on said ceramic.

2. A metalized ceramic comprising a highly refractory ceramic member having a tightly adhering metal surface thereon comprising a mixture of chromium and molybdenum, said chromium constituting 10% to 50% by weight of said metal surface and a portion of said chromium being combined with said ceramic to form a tightly adhering coating.

3. A metalized highly refractory ceramic member having a tightly adhering metal surface thereon, said metal surface consisting of a mixture of chromium and molybdenum.

4. The method of metalizing a surface of a ceramic member which comprises applying to said surface a mixture of metal powders in a vehicle, said mixture consisting essentially of 20% chromium and 80% molybdenum, heating said member and applied mixture of metal powders in an atmosphere non-oxidizing to said metal powders at a temperature of approximately 1625° C.

5. A metalized ceramic comprising a highly refractory ceramic member having a metal surface thereon consisting essentially of an admixture of chromium and molybdenum, and an interface consisting of a reaction product of a portion of said chromium and said ceramic tightly adhering said metal surface to said ceramic member.

References Cited in the file of this patent

UNITED STATES PATENTS

| | | |
|---|---|---|
| 2,159,806 | Lenz et al. | May 23, 1939 |
| 2,667,427 | Nolte | Jan. 26, 1954 |
| 2,715,593 | Clark | Aug. 16, 1955 |
| 2,803,729 | Kohring | Aug. 20, 1957 |
| 2,814,571 | Iversen | Nov. 26, 1957 |
| 2,820,727 | Grattidge | June 21, 1958 |
| 2,874,453 | Losco et al. | Feb. 24, 1959 |